(12) United States Patent
Bel

(10) Patent No.: US 10,676,202 B2
(45) Date of Patent: Jun. 9, 2020

(54) METHOD FOR AUTOMATIC SHUTDOWN OF ENGINES OF A TWIN-ENGINED AIRCRAFT

(71) Applicant: AIRBUS OPERATIONS (SAS), Toulouse (FR)

(72) Inventor: Laurent Bel, Gagnac-sur-Garonne (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 254 days.

(21) Appl. No.: 15/928,262

(22) Filed: Mar. 22, 2018

(65) Prior Publication Data

US 2018/0273196 A1    Sep. 27, 2018

(30) Foreign Application Priority Data

Mar. 27, 2017 (FR) ...................... 17 52525

(51) Int. Cl.
*B64D 31/06* (2006.01)
*B64D 43/00* (2006.01)
(Continued)

(52) U.S. Cl.
CPC ............ *B64D 31/06* (2013.01); *B64D 43/00* (2013.01); *F02C 9/42* (2013.01); *F02C 9/46* (2013.01);
(Continued)

(58) Field of Classification Search
CPC .................................................. B64D 31/06; B64D 43/00; B64D 2045/0085; B64D 31/00; F02C 9/46; F02C 9/42; F02C 6/20; F02C 9/00; G07C 5/0825; F05D 2260/80; F05D 2270/13; F05D 2270/093; F05D 2220/323
See application file for complete search history.

(56) References Cited

U.S. PATENT DOCUMENTS 4,303,976 A * 12/1981 Joby .................. F02C 9/42
60/224
2011/0116613 A1* 5/2011 Hlin ................ H04M 1/274566
379/142.06

(Continued)

FOREIGN PATENT DOCUMENTS

EP    2 570 617    3/2013
FR    3 035 642    11/2016

OTHER PUBLICATIONS

Search Report for FR1752525 dated Nov. 14, 2017, one (1) page.

*Primary Examiner* — Thomas Ingram
(74) *Attorney, Agent, or Firm* — Nixon & Vanderhye P.C.

(57) ABSTRACT

A method to automatically shutdown engines of a twin-engine aircraft where each engine is controlled by a control unit (4,5) and an interface device (6) coordinates the control units, the interface device having first and second operating modes, wherein the switching between modes is based on the airspeed and altitude of the aircraft; wherein in the first operating mode, the automatic shutdown can take place only on the first of the two engines (2,3) which exhibits an operational anomaly, and in the second operating mode, typically implemented during a cruise phase, the automatic shutdown will be able to be implemented on a first and then on a second engine (2,3) if the second engine exhibits an operational anomaly more severe than the one exhibited by the first engine.

12 Claims, 3 Drawing Sheets

(51) Int. Cl.
    *G07C 5/08*          (2006.01)
    *F02C 9/46*          (2006.01)
    *F02C 9/42*          (2006.01)
    *B64D 45/00*        (2006.01)

(52) U.S. Cl.
    CPC .... *G07C 5/0825* (2013.01); *B64D 2045/0085* (2013.01); *F05D 2260/80* (2013.01); *F05D 2270/093* (2013.01); *F05D 2270/13* (2013.01)

(56) References Cited

U.S. PATENT DOCUMENTS

2012/0116613 A1*   5/2012   Daumas .................... F02C 9/42
                                                                         701/3
2016/0318623 A1*  11/2016   Zaccaria ................ B64D 45/00

\* cited by examiner

METHOD FOR AUTOMATIC SHUTDOWN OF ENGINES OF A TWIN-ENGINED AIRCRAFT

RELATED APPLICATION

This application claims priority to French patent application 1752525 filed Mar. 27, 2017, the entirety of which is incorporated by reference.

FIELD

The invention relates to a method for the automatic shutdown of the engines of a twin-engined aircraft. The implementation of the method makes it possible to detect an abnormal functioning of one or of both of the two engines and to automatically shut down, in certain conditions, the engine or engines exhibiting an abnormal functioning.

BACKGROUND

Each aircraft engine is controlled and monitored by a dedicated control unit, such as a Full Authority Digital Engine Computer (FADEC). The control units are connected to an interface device, such as a Flight Management Guidance Envelope Computer (FMGEC) for managing the flight, the guidance and the flight envelope of the aircraft. The FMGEC computer harmonizes the controlling of the two engines by the FADEC control units.

Each FADEC control unit automatically activates a protection mode when the engine controlled by the FADEC exhibits an operational anomaly. The activation of a protection mode results in the virtually instantaneous shutting down of the engine to protect the integrity of the engine and consequently to subsequently avoid extensive repair operations on the ground.

In a known way, the interface device, e.g. FADEC, uses logic for inhibiting the protection modes to ensure that a protection mode can only be activated automatically on just one of the two engines. Each engine of a twin engine aircraft is sized so that by itself it can provide sufficient power to the aircraft for an emergency landing, at least under optimum safety conditions. While one engine is shut down and the other engine exhibits an operational anomaly, the logic of the interface device prevents an automatic shutdown of the one remaining operational engine. The one remaining operating engine can be shut down by the pilot who may issue a shutdown command, after the pilot evaluates the parameters of the engine.

This logic of the interface device, e.g., FMGEC, of shutting down one but not both engines is best adapted to flight phases such as aircraft climb after a take-off or aircraft descent before a landing since. During these take-off and landing phases, a pilot does not have sufficient time to restart a shutdown engine and must make best use of the power provided by the second engine, even if the second engine is exhibiting an operational anomaly.

SUMMARY

The inventor recognized that the conventional logic of the interface device, e.g., FMGEC, of shutting down one but not both engines is not optimized for a cruise flight phase.

The invention disclosed herein is, in one embodiment, a method for the automatic shutdown of the engines of an aircraft, the aircraft comprising two engines and two control units connected to an interface device, each control unit being dedicated to a restrictive one of the engines and being configured for activating a protection mode resulting in the shutdown of the engine when the engine is exhibiting a case of anomaly referenced in a database, a level being associated with each case of anomaly referenced in the database. The steps of the the method includes:

I. while the aircraft is below a predetermined altitude and speed, and following the activation of a protection mode on a first engine by a first control unit associated with the engine, the interface device receives from the first unit an activation signal comprising the information that a protection mode has been activated for the first engine and, on reception of the signal, the interface device sends to the second control unit an inhibit signal comprising an instruction prohibiting the activation of a protection mode on the second engine; and II. While the aircraft is above a predetermined altitude and speed, and following the activation, by a first control unit, of a protection mode on a first engine exhibiting a case of anomaly referenced in the database, the interface device receives from the first control unit an activation signal comprising the information that a protection mode has been activated for the first engine and also receives a severity level signal comprising information relating to the severity level of the anomaly and, on reception of the activation signal, the interface device sends to the second control unit an inhibit signal comprising an instruction prohibiting the activation of a protection mode on the second engine, wherein, while the aircraft is above the predetermined altitude and airspeed and in the case where the second engine subsequently exhibits a case of anomaly referenced in the database, the second control unit sends to the interface device a severity level signal comprising information relating to severity the level of the anomaly of the second engine and, on reception of the severity level signal, the interface device compares the severity level of the anomaly of the first engine with that of the of anomaly of the second engine, and wherein if the severity level of the anomaly of the second engine is the highest, the interface device sends to the second control unit an inhibit signal comprising an instruction authorizing the activation of an automatic protection mode on the second engine and the mode is activated by the second control unit, wherein the activation of a protection mode on the second engine remains prohibited by the interface device otherwise.

SUMMARY OF THE DRAWINGS

The features of the invention mentioned above, as well as others, will appear more clearly on reading the following description of examples of embodiment, the description being given with reference to the appended figures, which include.

DETAILED DESCRIPTION

Figure 1:
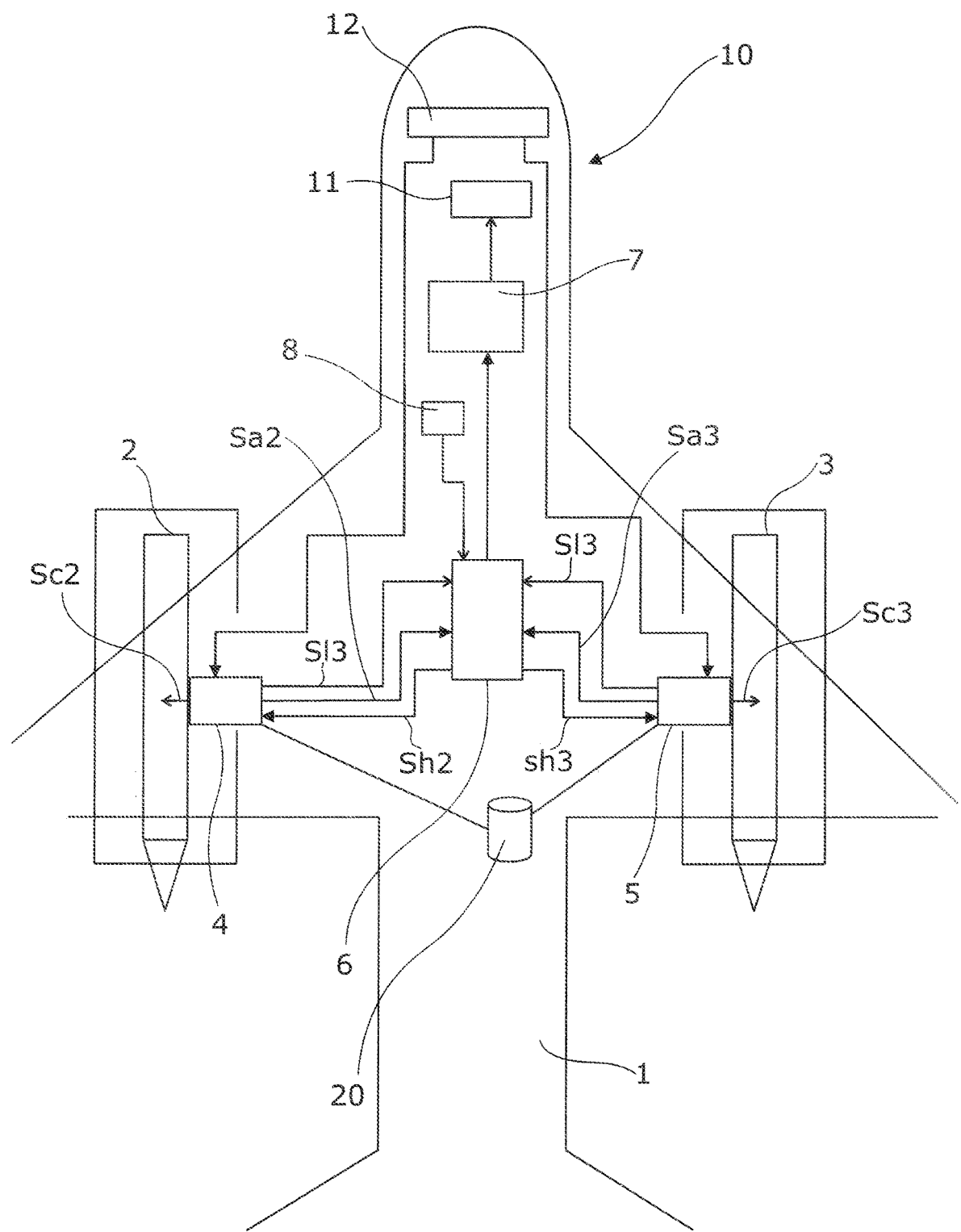
FIG. 1 is a diagrammatic view of an aircraft comprising two engines controlled by control units connected to an engine interface device for the implementation of a method for the automatic shutdown of the engines.

With reference to FIG. 1, an aircraft 1 comprises two engines 2, 3 each controlled by a control unit 4, 5, the two control units, such as FADECs, being connected to an interface device 6, such as a FMGEC, to coordinate the control of the engines 2, 3, such as turbofan engines. The interface device 6 is itself connected to a monitoring device 7, such as an Engine Warning Display (EWD), for displaying engine warnings to the crew in the case of failure of one of the engines. The interface device 6 is also in communication with a flight management system 8, such as a Flight Management System (FMS), which gathers and compiles all of the flight parameters of the aircraft and manages the flight of the aircraft 1.

The aircraft 1 also has a cockpit 10 in which is at least one display screen 11 for displaying to the pilots the warnings generated by the monitoring device and a man-machine interface 12 for controlling the engines (for example: engine throttles) connected to the control units.

In a known way, each control unit 4, 5 is configured for automatically activating a protection mode of the engine 2 or 3 being controlled by the control unit. Each control unit may shutdown its engine in response to a detected exhibited engine anomaly of the engine being controlled by the control unit.

The interface device 6 has two operating modes. The interface device selects one mode or the other mode based on the speed and the altitude of the aircraft 1. The first operating mode is a typical operating mode of the prior art where the automatic shutdown can only take place on the first of the two engines 2, 3 which exhibits a functional anomaly. In the second operating mode, which may be used in a cruise flight phase (typically at high altitude and high airspeed), the automatic shutdown will be able to be used on one and then on the other engine 2, 3 in certain circumstances.

A control unit 4, 5 (of the central processing unit type) is, for example, arranged in the nacelle (not shown) of the engine 2, 3 with which it is associated. The control unit 4, 5 is connected to various components (pumps, circuit-breakers, etc. which are not shown) of the engine 2, 3. The control unit controls its assigned engine and shuts down the engine in response to an exhibited anomaly of the engine. The control units are also in communication with the man-machine interface 12 to receive the instructions from the aircrew regarding control of the engine, such as throttle commands. The control units also communicate with the interface device 6, and system of sensors (not shown) installed on the engine 2, 3 and on engine components to monitor operational parameters of the engine and its components.

The control units 4, 5 have access to a database 20 which is a library of all the possible cases of engine anomalies that can occur on the engine 2, 3 and which necessitate the activation of a protection mode. The database 20 may be stored in a non-transitory electronic memory device which communicates with the control units and the interface unit.

The database 20 is shared between the two control units 4, 5 (as shown in FIG. 1) or, as a variant, each control unit has access to its own database 20, the databases of the two control units being identical.

Each case of engine anomaly stored in the data base is formed by a single anomaly or by a group of anomalies representing a functioning of the engine 2, 3 and/or of its components outside of a nominal protection envelope. Each case of engine anomaly listed in the database 20 has also stored in the database an associated severity level representing the severity of the anomaly. The severity level may be based on a scale of the severity as it relates to a range of all severities. The severity level may be, for example, a number in a range of one to ten (one indicating a low severity and ten a maximum severity). The level of severity for each anomaly may be determined by simulating the anomaly(ies) and the risk to the engine and aircraft of continuing to operate the engine while the anomaly remains. By way of example:

I. When the value of the temperature at the outlet of the nozzle of the engine 2, 3 has a tendency to rise and the control unit 4, 5 associated with the engine predicts that the value will exceed a maximum permissible threshold within a predetermined time lapse, the protection mode is activated because the control unit 4, 5 anticipates, by basing itself on a simulation model, a possible outbreak of fire. This case of anomaly has a low level because it is a matter of anticipation of a possible problem. The level of such a case of anomaly can be adjusted upward or downward as a function of the climatic conditions (pressure, temperature, etc.) which can influence the analysis of the simulation model by the control unit.

II. When a mechanical sensor detects an excessive speed of rotation of an engine shaft, the protection mode is activated by the control unit 4, 5 since such a situation indicates an engine breakage. This case of anomaly has a maximum level.

III. When a sensor detects a vibration rate of the engine which is too high, the protection mode is not activated by the control unit 4, 5 because this anomaly alone is not referenced as a case of anomaly necessitating an immediate shutdown of the engine.

IV. When the values gathered by one or several sensors connected to the control unit 4, 5 indicate an anomaly or a plurality of anomalies of the engine, the control unit 4, 5 consults the database 20 to associate the anomaly or the group of anomalies with at least one of the cases listed in the database. If the anomaly or the group of anomalies corresponds to at least one case of anomaly in the database, the control unit 4, 5 transmits a plurality of signals simultaneously to the engine 2, 3 which is associated with it and to the engine interface device 6. The signals include:

A. to the engine interface device 6: a signal S$l$2, S$l$3, called the level signal, comprising the information of the level of the case of anomaly (or the highest level of the cases of anomalies detected if the engine 2, 3 exhibits more than one case of anomaly), and a signal Sa2, Sa3, called an activation signal comprising the information that a protection mode has been activated for the engine 2, 3; and B. to the engine 6 (and its components): a signal Sc2, Sc3, called a shutdown signal, to shut down the engine. The engine shuts down on reception of this shutdown signal Sc2, Sc3.

The interface device 6 (of the central processing unit type) is connected to the monitoring device 7 to inform the pilots, via the display screen 11, of the activation of the protection mode on an engine 2, 3 and of the level of the case of anomaly having given rise to the activation (an indication is displayed on the display screen). Moreover, the interface device 6 is connected to the flight management system 8 which informs it of the altitude and speed parameters of the aircraft 1. The interface device 6 selects its operating mode as a function of these parameters. By way of example, the second operating mode is activated for a speed of the aircraft greater than or equal to 600 km/h and an altitude of the aircraft greater than or equal to 7000 m, whereas the first mode is activated for a speed of the aircraft 1 less than 600 km/h and an altitude of the aircraft less than 7000 m.

The interface device 6 is configured for receiving the activation signal Sa2, Sa3 from each control unit and for transmitting an inhibit signal Sh1, Sh2 to each control unit 4, 5 to authorize or prohibit the activation of a protection mode according to the instructions contained in the signal.

The interface device 6 is moreover configured for receiving the level signal Sl1, Sl2 from each control unit 4, 5 and, in the case where it receives a level signal of a second engine 2, 3 after having received a level signal of a first engine, for comparing the levels of the cases of anomalies contained in the level signals Sl1 and Sl2.

The signals exchanged between a control unit 4, 5 and the interface device 6 can be of any type known to those skilled in the art. The activation signals Sa2, Sa3 and the inhibit signals Sh2, Sh3 are for example Boolean signals having two states, TRUE or FALSE. In this case, in a TRUE state, the inhibit signal Sh2, Sh3 authorizes a control unit 4, 5 to activate a protection mode or in the opposite case, in a FALSE state, prohibits a control unit 4, 5 from activating a protection mode by inhibiting the sending to the interface device 6 of the activation signal Sa2, Sa3 and the sending of the shutdown signal Sc2, Sc3 to the engine 2, 3. The activation signal Sa2, Sa3 indicates in a TRUE state that the protection mode is activated for the engine 2, 3 or in a FALSE state that no protection mode is activated for the engine 2, 3.

Figure 2:
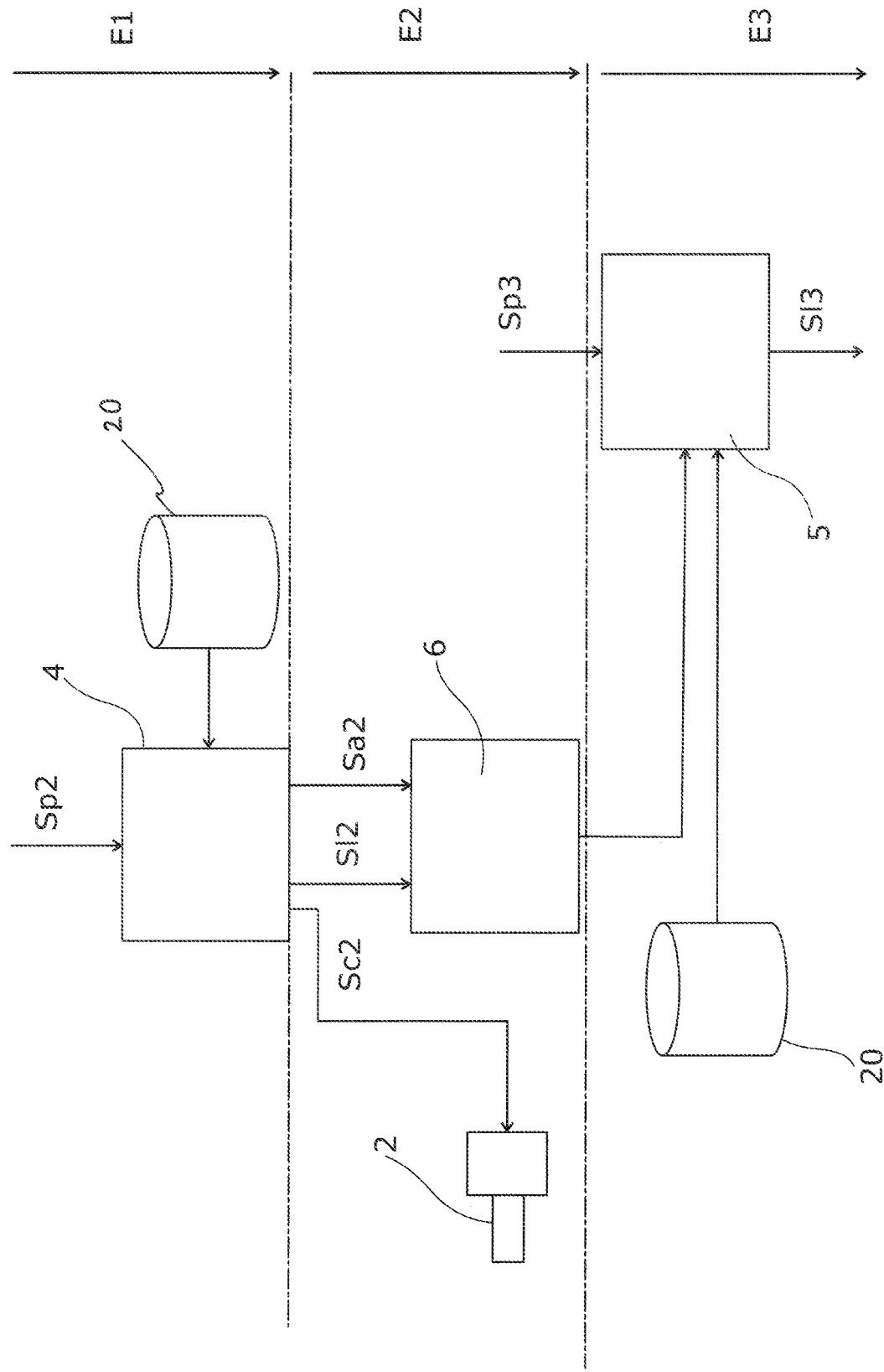
FIG. 2 is a diagram illustrating the different steps of the method for the automatic shutdown of the engines of a twin-engine aircraft in a first operating mode of the interface device shown in FIG. 1.

In an operational example of the first operating mode of the interface device 6, and with reference to FIG. 2, when a first engine 2 is exhibiting an operational anomaly, at least one sensor associated with the first engine transmits to the first control unit 4 a signal Sp2 (not shown in FIG. 1) representing this anomaly (for example the amplitude of the signal from the sensor exceeds a predetermined threshold when the signal from the sensor is an analogue signal).

In a first step E1, the first control unit 4, associated with the first engine 2, consults the database 20 to search for a correspondence between the anomaly or the group of anomalies and at least one of the cases of anomalies listed in the database. If a correspondence is found, the first control unit 4 sends the shutdown signal Sc2 to the first engine 2 and sends to the interface device 6 an activation signal Sa2 indicating the implementation of the protection mode, as well as the level signal Sl2 indicating the level in the case of anomaly having initiated the activation of the protection mode. If no correspondence is found, no signal is sent by the first control unit 4 and the protection mode is not activated for the first engine 2.

In a step E2, on reception of the activation signal Sa2 indicating the implementation of the protection mode on the first engine 2, the interface device 6 sends an inhibit signal Sh3 to the second control unit 5 associated with the second engine 3, the inhibit signal Sh3 comprising an instruction (for example, FALSE state of the signal if the latter is a Boolean) blocking the sending of the shutdown signal Sc3 to the second engine 3 to prohibit the second control unit 5 from activating a protection mode on the second engine 3.

If the second engine 3 subsequently exhibits a case of anomaly, at least one sensor associated with the second engine transmits to the second control unit 5 a signal Sp3 (not shown in FIG. 1) indicating that anomaly.

On reception of the signal Sp3, the second control unit 5 consults, in step E3, the database 20 to search for a correspondence between the anomaly or the group of anomalies and at least one of the cases of anomalies listed in the database. If a correspondence is found, the second control unit 5 can uniquely send, to the interface device 6, the level signal Sl3 indicating the level of the case of anomaly of the second engine, but the second engine will not be shut down automatically.

Figure 3:
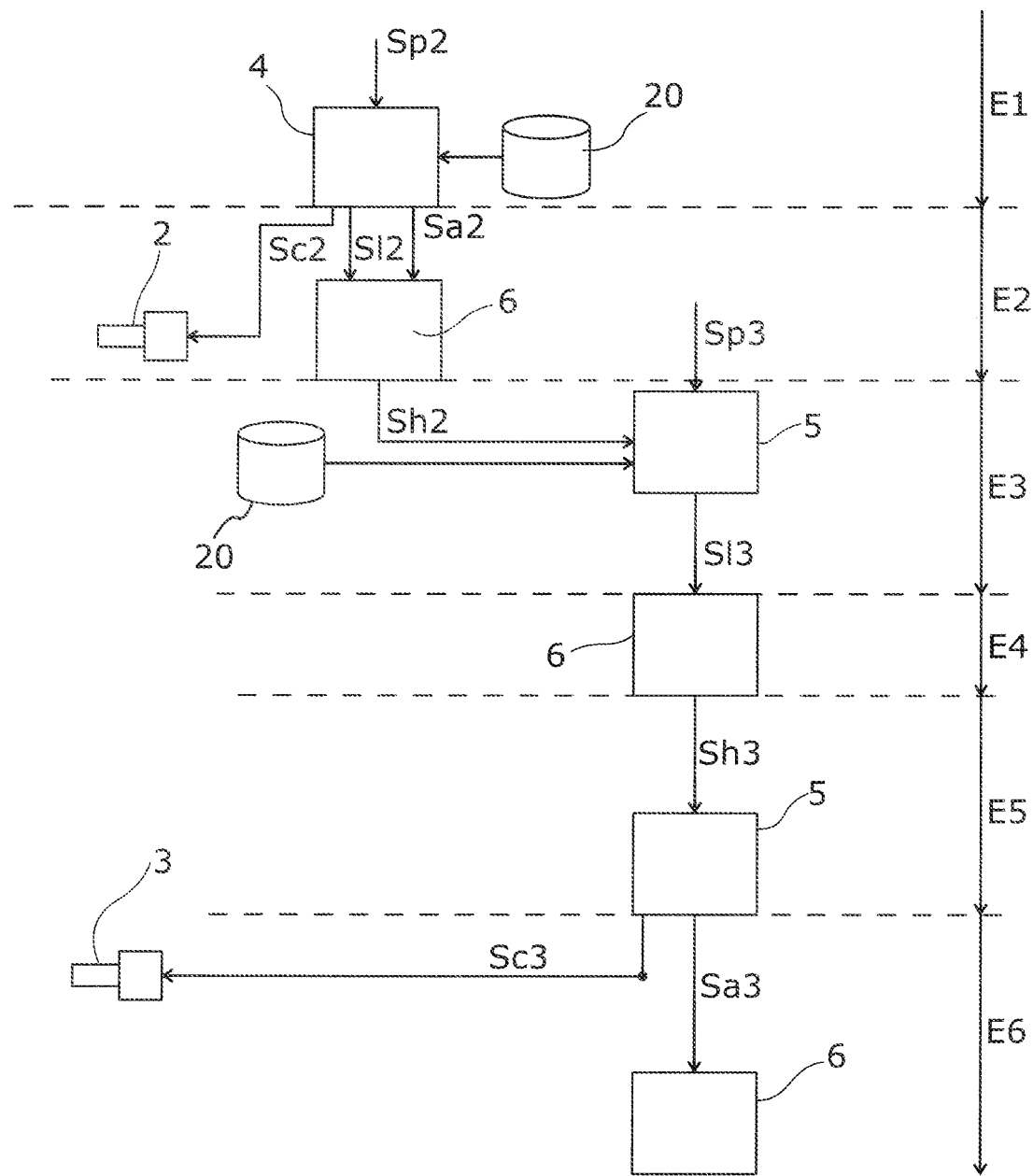
FIG. 3 is a diagram illustrating the different steps of the method for the automatic shutdown of the engines of a twin-engined aircraft in a second operating mode of the interface device shown in FIG. 1.

In an operational example of the second operating mode of the interface device 5, and with reference to FIG. 3, when a first engine 2 is exhibiting an operational anomaly, at least one sensor associated with the first engine transmits to the first control unit 4 a signal Sp2 (not shown in FIG. 1) indicating that anomaly.

In a first step E1, the first control unit 4, associated with the first engine 2, consults the database 20 to search for a correspondence between the anomaly or the group of anomalies and at least one of the cases of anomalies listed in the database. If a correspondence is found, the first control unit 4 sends the shutdown signal Sc2 to shut down the first engine 2 and sends to the interface device 6 the activation signal Sa2 indicating the implementation of the protection mode, as well as the level signal Sl2 indicating the level of the case of anomaly having initiated the activation of the protection mode. If no correspondence is found, no signal is sent by the first control unit 4 and the protection mode is not activated for the first engine 2.

In a step E2, on reception of the activation signal Sa2, the interface device sends an inhibit signal Sh3 to the second control unit 5, the inhibit signal Sh3 comprising an instruction to prohibit the second control unit 5 from activating a protection mode on the second engine 3.

If the second engine 3 subsequently exhibits a case of anomaly, at least one sensor associated with the second engine transmits to the second control unit 5 a signal Sp3 (not shown in FIG. 1) indicating that anomaly.

On reception of the signal Sp3, the second control unit 5 consults, in a step E3, the database 20 to search for a correspondence between the anomaly or the group of anomalies and at least one of the cases of anomalies listed in the database. If a correspondence is found, the second control unit 4 can uniquely send, to the interface device 6, the level signal Sl3 indicating the level of severity of the case of anomaly exhibited by the second engine 3.

In a step E4, the interface device 6 receives the level signal Sl3 from the second control unit 5 and compares the level of the case of anomaly exhibited by the first engine 2 and contained in the signal Sl2 with the level of the case of anomaly exhibited by the second engine 3 and contained in the signal Sl3.

If the level of the case of anomaly on the first engine 2 is the highest one or equal to the level of the case of anomaly on the second engine 3, the inhibit signal is not modified and still prohibits the second control unit 5 from activating the protection mode on the second engine 3.

On the other hand, if the level of severity of the case of anomaly exhibited by the second engine 3 is the highest one, the interface device 6, in a step E5, sends an inhibit signal Sh3 to the second control unit 5, comprising an instruction (for example changing from the FALSE state to the TRUE state of the signal if the latter is a Boolean) to authorize the sending, by the control unit, of the shutdown signal Sc3 and of the activation signal Sa3.

On reception of this inhibit signal Sh3 authorizing the activation of the protection mode, in a step E6, the second control unit 5 sends the shutdown signal Sc3 to the second engine 3 and the activation signal Sa3 to the interface device 6. Consequently both of the engines 2, 3 are shut down and the pilot receives indication of this on the display screen 11.

The automatic shutdown method is adapted to the evolution of the operational situation of the aircraft 1 whilst meeting strict safety requirements.

In fact, in the first operating mode of the interface device 5, because of the speed or the altitude of the aircraft 1 for which this first mode is activated, the automatic shutdown of both of the engines 2, 3 is excluded so that the pilot has the power to act on all of the engines simultaneously.

In its second operating mode, the interface device 6 prohibits a control unit 5 associated with a second engine 3 from activating a protection mode if the other control unit 4 associated with a first engine 2 has already activated a protection mode, except if the level of the case of anomaly which the second engine 3 exhibits has a higher level than the one exhibited by the first engine 2. In the case of automatic shutdown of both of the engines 2, 3 because of the altitude/speed attained during the cruise phase in which the shutdown of the second engine 3 takes place, the pilot, after analysis of the parameters of the first engine, will attempt, at his discretion, to restart the first engine 1 which is exhibiting a less severe case of anomaly than the second engine 3.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for automatically controlling shutdowns of an aircraft having first and second engines, the method comprising:
   while the aircraft is below a predetermined altitude and an airspeed and in response to the first engine experiencing an engine anomaly, a control unit automatically places the first engine in a protection mode and informs an interface device of the protection mode which causes the interface device to send an inhibit signal to a second control unit which prohibits the second control unit from activating a protection mode for the second engine; and
   while the aircraft is above the predetermined altitude and airspeed, the first control unit responds to a first anomaly in the first engine by placing the first engine in the protection mode and sending information identifying the first anomaly to the interface device, wherein the information identifies the first anomaly sufficiently to correlate the first anomaly with a corresponding anomaly referenced in a database and having a severity level stored in the database, and the interface device sends to the second control unit an inhibit signal instructing the second control unit to prohibit activation of a protection mode on the second engine,
   while the aircraft is above the predetermined altitude and airspeed and while the second control unit is subject to the inhibit signal, the second control unit responds to a second anomaly in the second engine by sending the interface device a level signal indicating a level of severity of second anomaly and, in response to the level signal, the interface device identifies which of the first and second anomaly has the highest level of severity and instructs the first or second control unit corresponding to the first or second engine with the highest level of severity to place the corresponding first or second aircraft engine in the protection mode and inhibits the other control unit from placing its corresponding first or second aircraft engine in a protection mode.

2. The method according to claim 1, wherein the predetermined speed is at least 600 km/h.

3. The method according to claim 1, wherein the predetermined altitude is at least 7000 m.

4. The method according to claim 1, wherein an indication relating to the activation of a protection mode on the first or second engine is displayed on a display screen in a cockpit of the aircraft.

5. The method according to claim 1, wherein an indication relating to the level of an anomaly of the first or second engine is displayed on a display screen in a cockpit of the aircraft.

6. The method according to claim 1 wherein the protection mode includes shutting down the engine placed in the protection mode.

7. A method for automatically controlling shutdowns of a twin engine aircraft having first and second engines, the method comprising:
   inhibiting automatic shutdowns of both the first and second engines while the aircraft is in flight and is below a predetermined altitude and an airspeed;
   while the aircraft is in flight and above the predetermined altitude and airspeed, automatically responding to an anomaly in only one of the first and second engines by automatically shutting down the one of the first and second engines experiencing the anomaly and inhibiting automatic shutdowns of the other of the first and second engines;
   while the aircraft is in flight and above the predetermined altitude and airspeed, automatically responding to anomalies in both of the first and second engines by determining which of the first and second engines has a most severe anomaly and shutting down the first or second engine having the most severe anomaly and inhibiting an automatic shutdown of the other of the first and second engines.

8. The method of claim 7 further comprising automatically restarting the first or second engine having the most severe anomaly.

9. The method of claim 7 further comprising determining the most severe anomaly by accessing a database of anomalies, reading from the database a first severity level of an anomaly of the first engine and a second severity level of an anomaly of the second engine, and comparing the first and second severity levels to determine the most severe anomaly.

10. The method of claim 7 wherein the first and second engines are turbofan engines.

11. An engine control system for a twin-engine aircraft comprising:
   a first control unit configured to automatically shut down a first engine of the twin engine aircraft upon detection of an anomaly in operation of the first engine;
   a second control unit configured to automatically shut down a second engine of the twin engine aircraft upon detection of an anomaly in operation of the second engine;
   an interface device which communicates with each of the first and second control units and is configured to:
      inhibit one of the first and second control units from automatically shutting down the respective first and second engine while the other of the first and second engines is shut down and the aircraft is in flight and below a predetermined altitude and airspeed; and while the aircraft is in flight and above a predetermined altitude and airspeed, automatically respond to anomalies in both of the first and second engines by determining which of the first and second engines has a most severe anomaly and permitting the first or second control unit associated with the first or second engine with the most severe anomaly to automatically shut down and inhibiting the other of the first or second control unit from shutting down the first or second engine having a less severe anomaly.

12. The engine control system of claim 11 further comprising a non-transitory electronic memory unit configured to store a database of information identifying a severity level for each of a plurality of different anomalies, and the interface device compares the severity levels obtained from the database for each of the anomalies in the first and second engines to perform the determining of the most severe anomaly.

* * * * *